United States Patent
Melrose et al.

(10) Patent No.: US 7,525,754 B2
(45) Date of Patent: Apr. 28, 2009

(54) REPEATED RUNOUT COMPENSATION USING SCALED POSITION SIGNALS

(75) Inventors: Thomas O. Melrose, Longmont, CO (US); Bruce Liikanen, Berthod, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/768,522

(22) Filed: Jun. 26, 2007

(65) Prior Publication Data

US 2009/0002874 A1 Jan. 1, 2009

(51) Int. Cl.
*G11B 5/596* (2006.01)

(52) U.S. Cl. ........................ 360/77.04; 360/31
(58) Field of Classification Search ............... None
See application file for complete search history.

(56) References Cited

U.S. PATENT DOCUMENTS

| | | | |
|---|---|---|---|
| 5,041,926 | A | 8/1991 | Ockerse et al. |
| 6,549,362 | B1 | 4/2003 | Melrose et al. |
| 6,646,824 | B1 | 11/2003 | Takaishi et al. |
| 6,847,503 | B2 * | 1/2005 | Zhang et al. ............. 360/77.04 |
| 6,965,491 | B1 | 11/2005 | Perlmutter et al. |
| 6,965,547 | B2 | 11/2005 | Kadlec et al. |
| 7,106,547 | B1 * | 9/2006 | Hargarten et al. ........ 360/77.04 |
| 7,139,150 | B2 | 11/2006 | Spaur et al. |
| 2005/0174680 | A1 | 8/2005 | Spaur et al. |
| 2007/0096678 | A1 * | 5/2007 | Melrose ...................... 318/652 |
| 2007/0297088 | A1 * | 12/2007 | Sun et al. ................. 360/77.04 |

* cited by examiner

*Primary Examiner*—Jason C Olson
(74) *Attorney, Agent, or Firm*—Fellers, Snider, et al.

(57) ABSTRACT

In accordance with various embodiments, a radial separation distance between first and second servo seams on a storage medium is determined, and a scaled position signal is generated in relation to the determined radial separation distance and a measured position signal. An error runout correction (ERC) value is obtained from the scaled position signal, and the ERC value is thereafter used to compensate for repeated runout (RRO) error.

19 Claims, 7 Drawing Sheets

REPEATED RUNOUT COMPENSATION USING SCALED POSITION SIGNALS

BACKGROUND

The present case is generally directed to compensating for repeated runout (RRO) error. Servo data are often provided on storage media of a data storage device. The servo data are used by a servo system of the device to position a transducer during data I/O (read and write) operations. As will be appreciated, errors in the placement of the servo data can introduce RRO error, which can adversely affect servo system performance.

SUMMARY

In accordance with various embodiments, a radial separation distance between first and second servo seams on a storage medium is determined, and a scaled position signal is generated in relation to the determined radial separation distance and a measured position signal. An error runout correction (ERC) value is obtained from the scaled position signal, and the ERC value is thereafter used to compensate for repeated runout (RRO) error.

DETAILED DESCRIPTION

Figure 1:
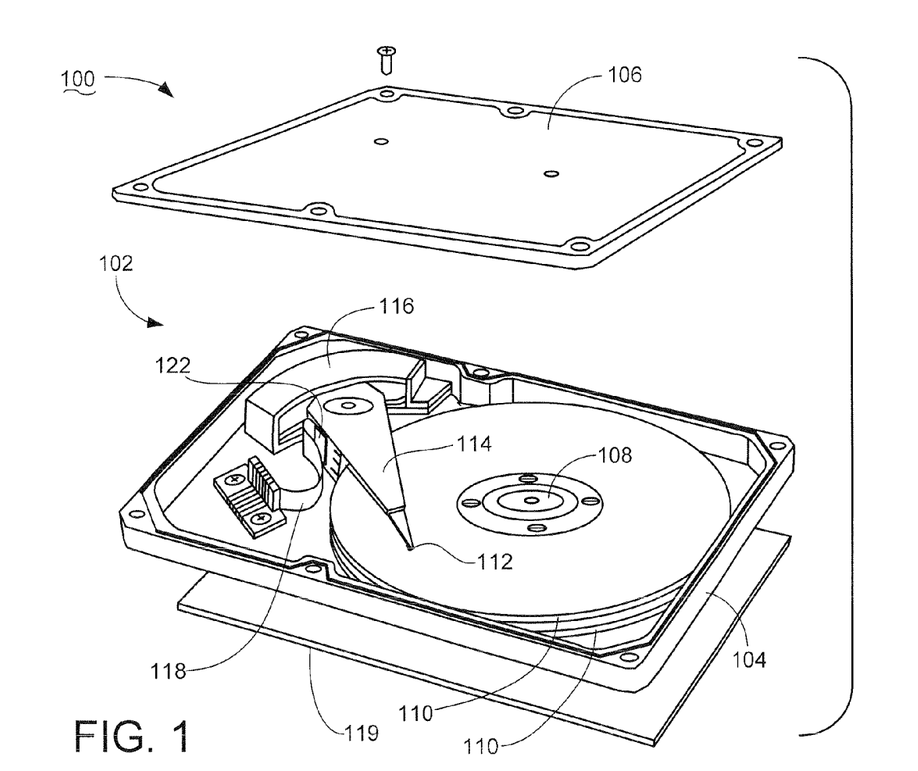
FIG. 1 is an exploded isometric view of an exemplary data storage device in which preferred embodiments of the present invention can be advantageously practiced.

FIG. 1 provides a top plan view of a data storage device 100. The device 100 is provided to show an exemplary application in which preferred embodiments of the present invention may be utilized. It will be understood, however, that the claimed invention is not so limited to the exemplary embodiments disclosed herein.

The device 100 includes a housing 102 formed from a base deck 104 and top cover 106. An internally disposed spindle motor 108 is configured to rotate a number of storage media 110. The media 110 are accessed by a corresponding array of data transducers 112. While FIG. 1 shows the use of two magnetic recording discs and four corresponding heads, other numbers of heads and discs (such as a single disc, etc.), as well as other types of media can be readily utilized in the device 100 as desired.

A head-stack assembly ("HSA" or "actuator") is shown at 114. The actuator 114 preferably rotates through application of current to a voice coil motor (VCM) 116. Controlled operation of the VCM 116 causes the transducers 112 to align with tracks (not shown) defined on the media surfaces to store data thereto or retrieve data therefrom. A flex circuit assembly 118 provides electrical communication paths between the actuator 114 and device control electronics on an externally disposed printed circuit board (PCB) 119.

Figure 2:
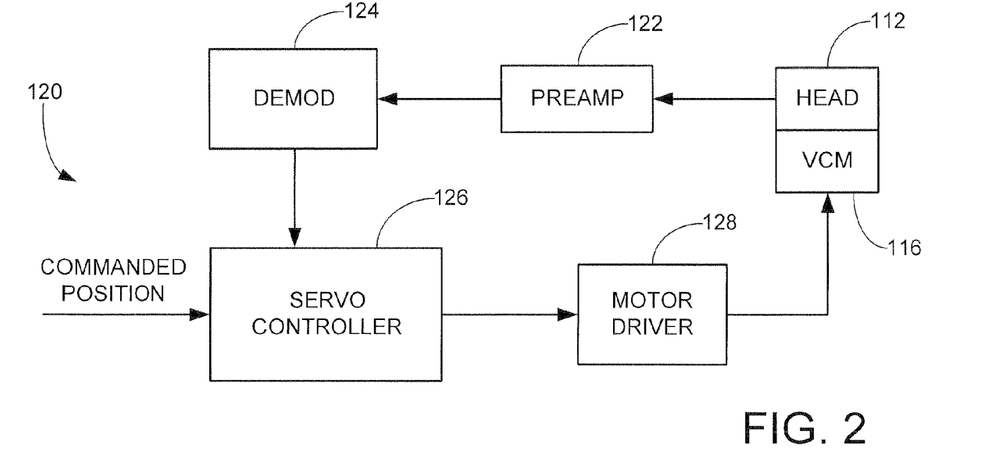
FIG. 2 provides a functional representation of a closed loop servo control circuit of the device of FIG. 1.

FIG. 2 provides a generalized functional block diagram for a closed loop servo control circuit 120 of the device 100. Preferably, embedded servo data are transduced from the media 110 by a selected transducer (head) 112 and provided to a preamplifier/driver (preamp) circuit 122.

The preamp circuit 122 preamplifies and filters the readback signals firm the transducer 112, and provides the processed servo data to a demodulation (demod) circuit 124. The demod circuit 124 operates to detect and conditions the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112. The servo controller 126 is preferably characterized as a programmable processor with associated servo code to direct the operation of the servo loop, although the servo controller 126, or portions thereof, can alternatively be realized in hardware.

The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) a selected track in order to carry out data I/O operations with the track.

Figure 3:
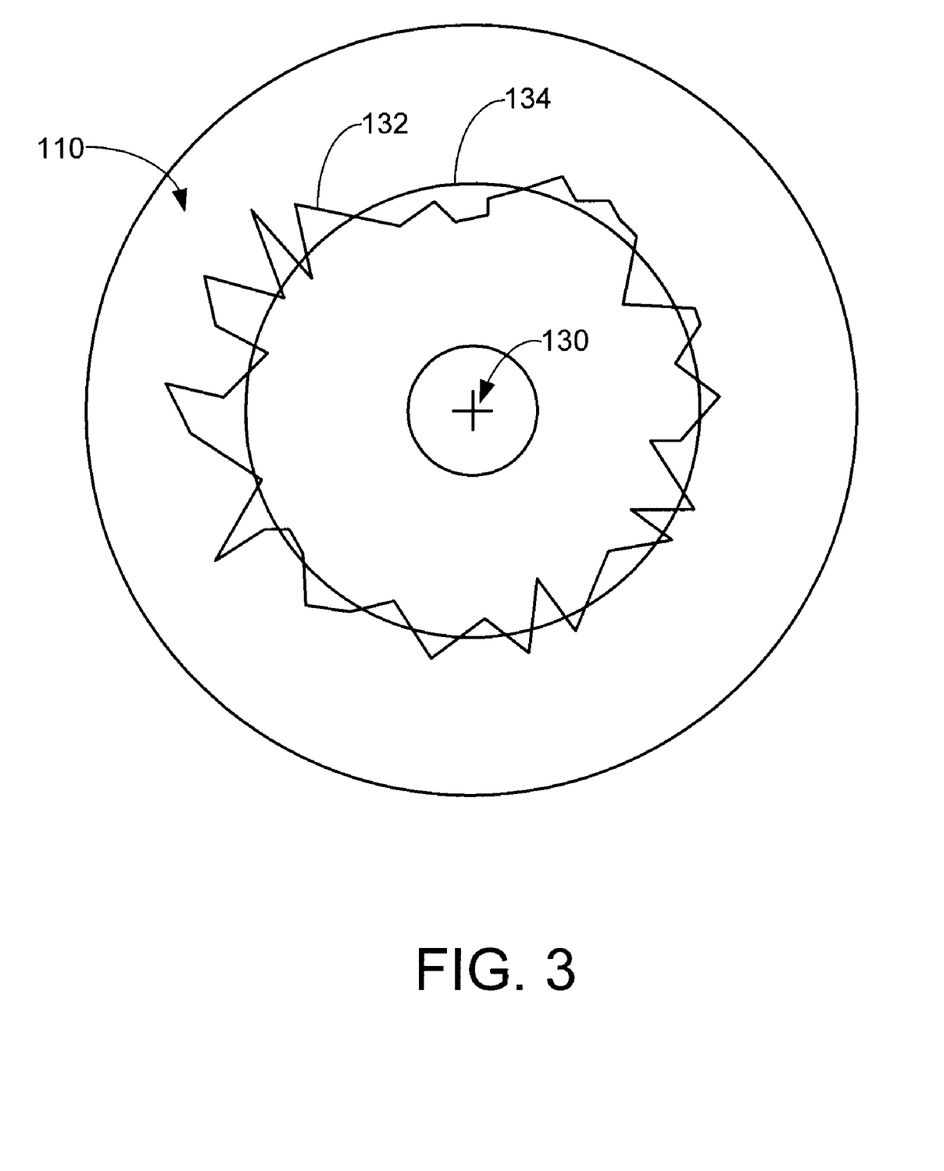
FIG. 3 is a top down diagrammatic view of a magnetic storage medium of the device of FIG. 1 having a perturbed data track.

FIG. 3 provides a top down diagrammatic view of a selected magnetic storage medium 110 of the device 100 of FIG. 1. The medium is preferably substantially circular in shape and includes a center point 130.

The medium 110 is contemplated as including plurality of concentric data tracks to which user data are stored. For purposes of illustration, only a single data track 132 is shown, with an exaggerated amount of perturbation (repeated runout error, or RRO). The track 132 preferably includes a number of angularly spaced apart servo data fields (not shown) with user data stored in data sectors therebetween (also not shown). The RRO is induced by errors in the placement of the servo data that would otherwise nominally define an ideal circular track 134 on the medium 110.

Figure 4:
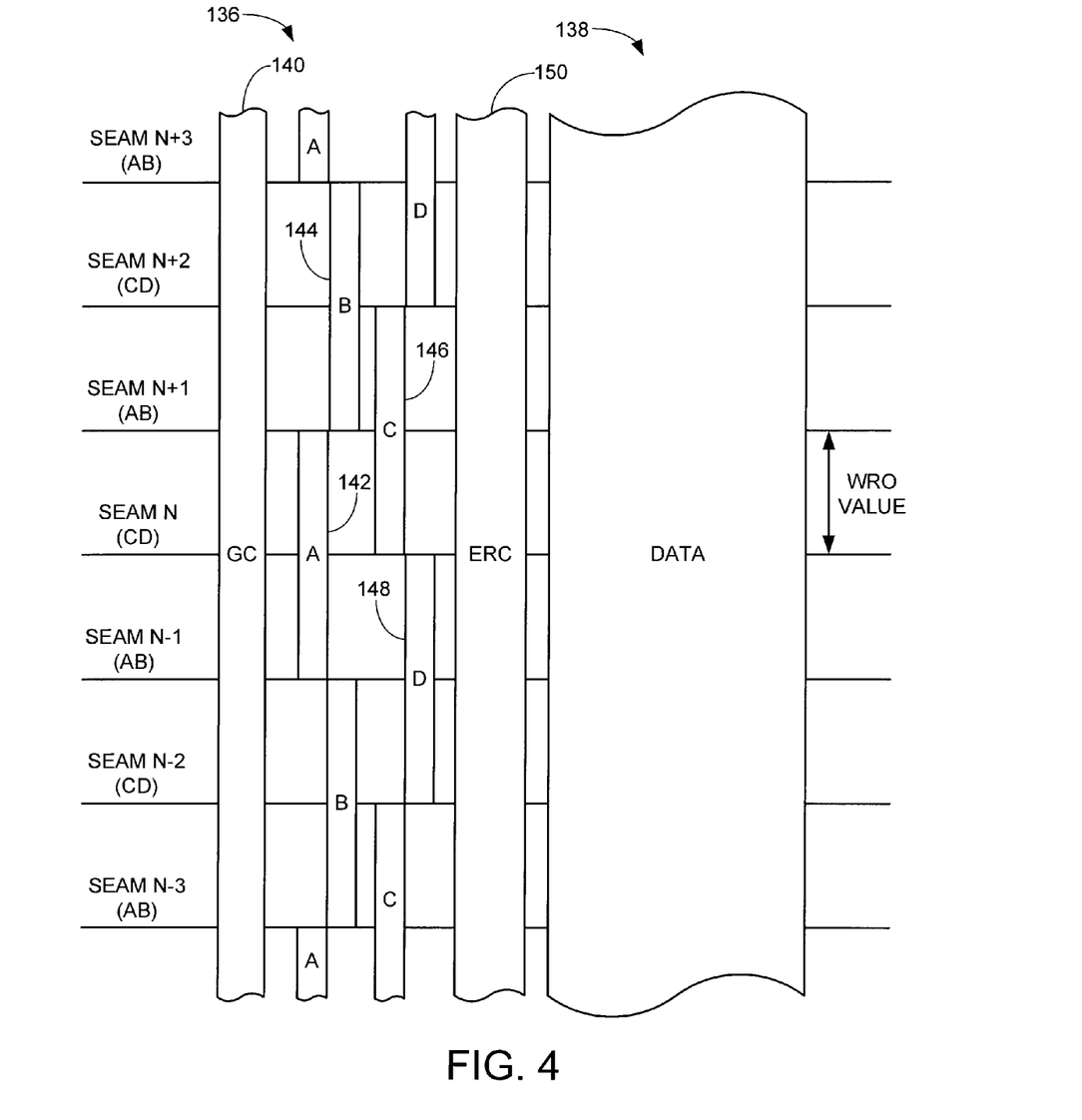
FIG. 4 is a diagram of an exemplary portion of a magnetic storage medium with ideal servo dibit seams.

FIG. 4 generally illustrates a preferred manner in which data are nominally stored on the media 110. The servo data of the servo fields discussed in FIG. 2 are preferably arranged into radially extending spokes, a portion of one being represented in FIG. 3 at 136. An adjacent user data region is generally denoted at 138.

The servo data include a Gray code (GC) block 140 to provide track addressing information to the servo circuit 120. Servo burst blocks (also referred to as dibit patterns) are identified as A, B, C, D patterns 142, 144, 146 and 148. The patterns provide fine positional information to the servo circuit 120. An error runout correction (ERC) block is shown at 150 and is used to store ERC values as explained below.

While a quadrature (ABCD) pattern is shown in FIG. 4, this is merely exemplary in nature, as any number of different servo formats and arrangements can be utilized as desired. The servo data are preferably written during device manufacturing using a servo track writer (STW), although the device can alternatively use a self-servo write process (with or without seed tracks from an STW) to generate the servo data.

A number of servo seams are denoted from N−3 to N+3. Each servo seam nominally represents a junction, or seam, between adjacent ones of the ABCD patterns; for example, seam N is at a CD junction, seam N+1 is at the next radial AB junction, and so on. Preferably, each seam will be nominally aligned at the same radial position in each of the servo spokes 136 around the circumference of the medium 110, thereby defining an ideal circular path such as represented by ideal track 134 in FIG. 3.

A written in runout (WRO) value generally relates to the distance between each pair of adjacent seams. The servo write process preferably attempts to provide the same target WRO value for each pair of adjacent seams, so that the data nominally match that shown in FIG. 3.

During device operation, the associated transducer reads the ABCD burst patterns as the medium 110 rotates adjacent the transducer. The recovered burst data are demodulated and fed into the servo loop to provide an indication of the actual location of the transducer 112 with respect to the medium.

A position signal referred to herein as a position error signal (PES) is generated in relation to the error between the actual position and a commanded position, and a correction signal is output to the VCM driver to minimize the PES. Preferably, the servo controller provides 256 steps, or increments, across each WRO interval, and relies on the WRO being nominally consistent in order to provide a nominally linear PES.

Figure 5:
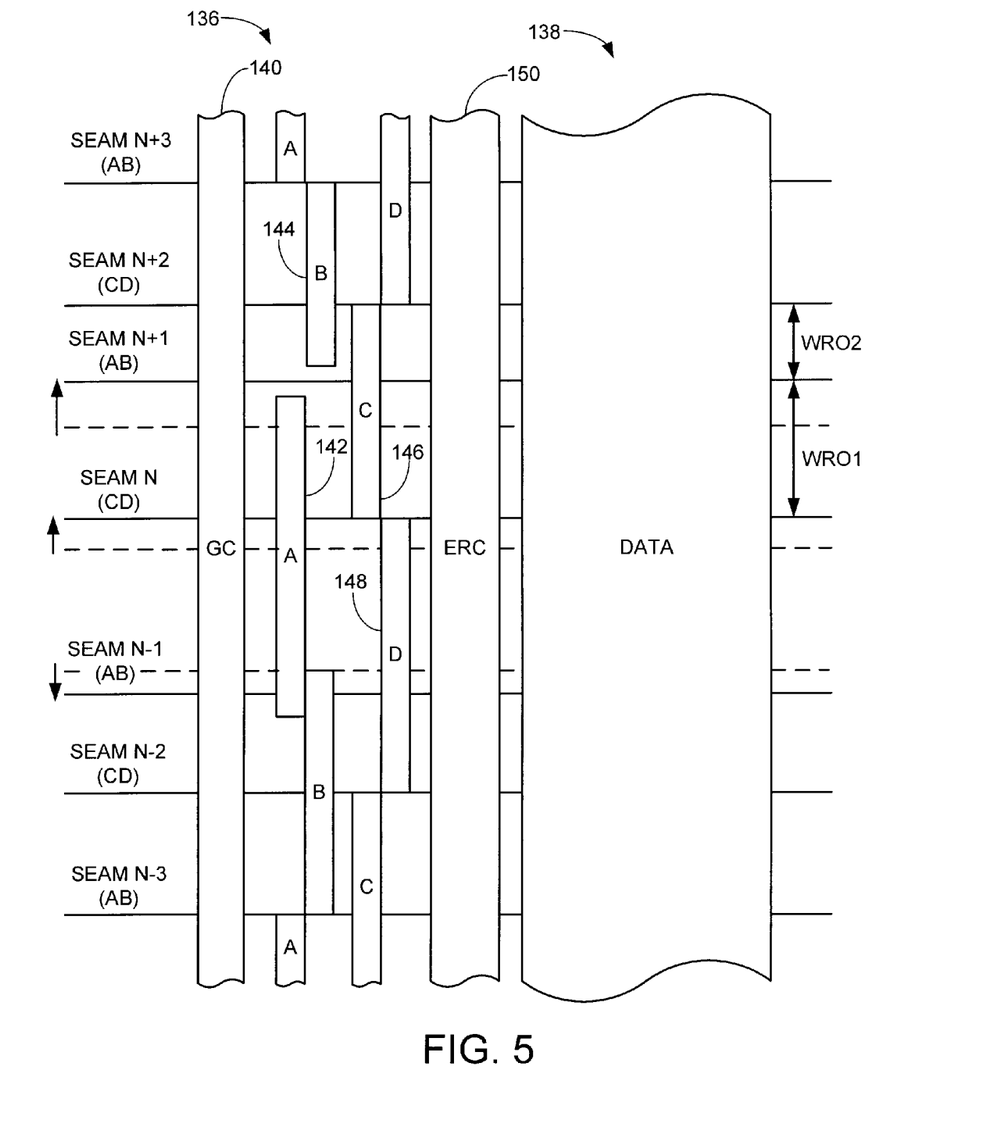
FIG. 5 is a diagram of an exemplary portion of a magnetic storage medium containing misplaced seams.

Errors in the locations of the ABCD burst patterns can induce RRO and non-linearities in the operation of the servo circuit 120, thereby causing repeated perturbations in the positioning of the transducer. FIG. 5 provides another representation of data on a selected medium 110 of the device 100 to generally illustrate exemplary types of burst pattern errors that may arise.

As shown in FIG. 5, seam N for the selected spoke 136 is shown to be displaced upwardly (i.e., toward the center 130 of the medium 110) as compared to the ideal location for this seam from FIG. 4 (shown in broken line fashion). The associated CD patterns 146, 148 at seam N still meet at their respective corners, but the junction is displaced from the desired location.

Seam N+1 for the selected spoke 136 is also displaced upwardly, but a gap is provided between the associated AB patterns 142, 144. Seam N−1 is displaced downwardly (away from center 130), and the associated C pattern 146 overlaps the associated D pattern 148. It is contemplated that other types of servo errors can readily occur apart from those exemplified in FIG. 5. It is further contemplated that other errors may also be present in the remaining servo spokes along a given seam around the medium 110.

It can be seen that the WRO values for the seams illustrated in FIG. 5 deviate from FIG. 4; for example, a WRO1 value between seams N and N+1 is larger than the nominal WRO value, while a WRO2 value between seams N+1 and N+2 is smaller than the nominal WRO value. Because the WRO between seams now differs, the linearity of servo gain at the location of the altered WRO can no longer be assured, and methodologies that compensate for RRO error based on PES measurements may provide sub-optimal results.

Figure 6:
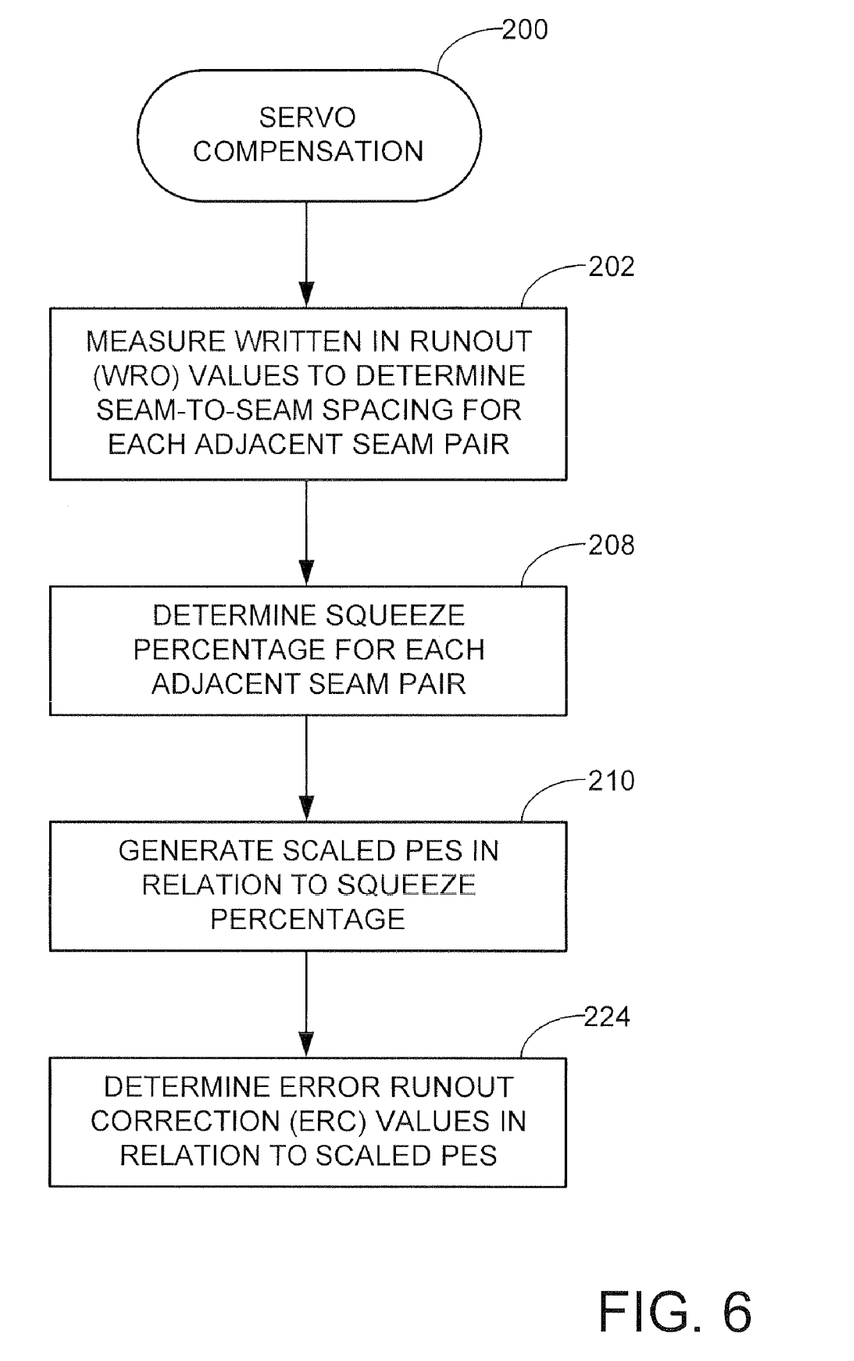
FIG. 6 is a flow diagram illustrating a preferred embodiment of a method for compensating for nonlinearity in a servo system such as FIG. 2.

Accordingly, FIG. 6 provides a SERVO COMPENSATION routine 200, generally illustrative of steps carried out in accordance with various embodiments of the present invention. The routine 200 preferably represents programming steps carried out by the servo controller 126, although such is not limiting. The generalized steps in the routine 200 can be carried out on each portion of the medium in turn, or can be applied in a step-wise fashion across the medium as a whole, as desired.

At step 202, WRO values are first preferably measured for each adjacent seam pair on the associated medium 110 to determine the seam-to-seam spacing therebetween. A suitable approach that can be adapted for use during step 202 is exemplified by U.S. Pat. No. 6,965,491 to Perlmutter et al. Preferably, the servo controller 126 operates to servo at one (or more) selected locations between the adjacent seams while measuring the respective servo dibit patterns over one (or more) entire revolutions of the medium.

Figure 7:
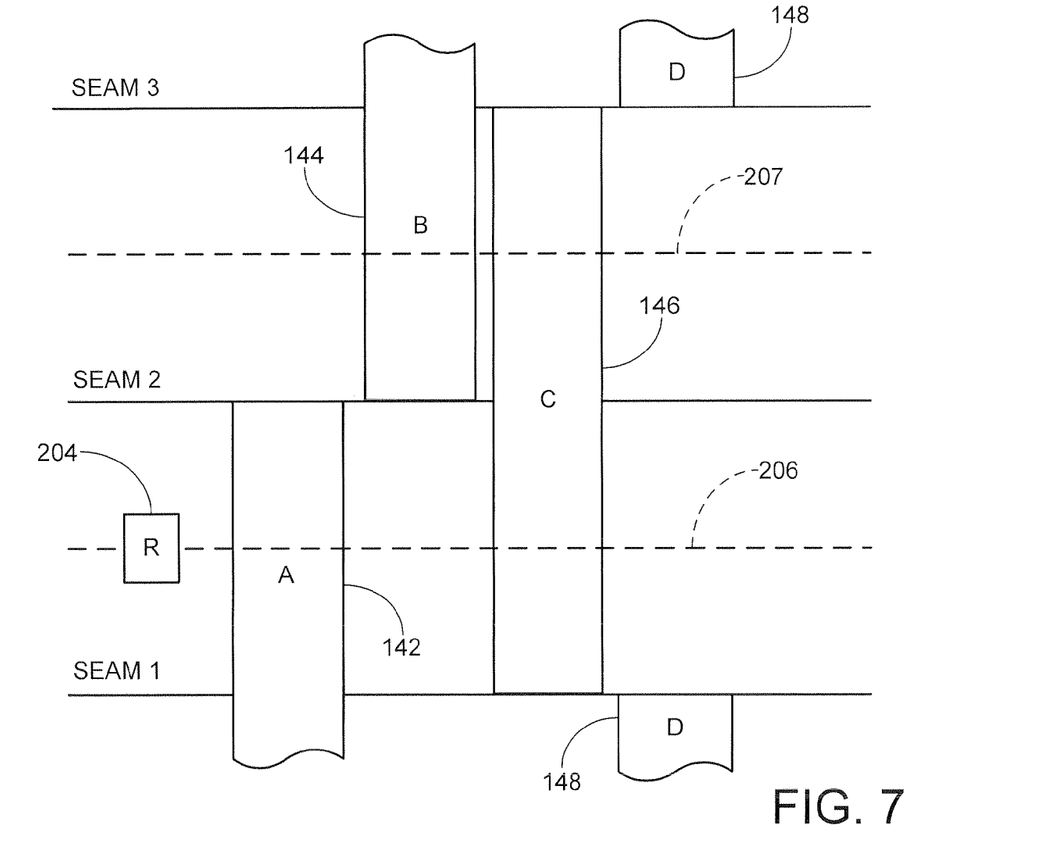
FIG. 7 generally illustrates a preferred manner in which written in runout (WRO) values are determined in conjunction with the routine of FIG. 6.

In a preferred embodiment, as shown in FIG. 7 a read (R) element 204 of the associated transducer 112 is preferably positioned nominally halfway between adjacent seams 1 and 2 at a four-burst null position (broken line 206). This enables the read element 204 to transduce a magnitude value for each of the associated ABCD dibit patterns 142, 144, 146, 148 that will provide equal magnitude differentials of:

$$A-B=C-D \tag{1}$$

The transducer 112 is next preferably positioned halfway between the next adjacent seams 2 and 3 at four-burst null position 207. The radial distance that the read element 204 moves between the respective null positions 206, 207 generally corresponds to the WRO value for a pair of the seams (e.g., seams 1 and 2), and is used accordingly.

This approach advantageously reduces the number of revolutions required to carry out the WRO measurements of step 202 to essentially one revolution per seam pair. However, such is not limiting as multiple revolutions and multiple positions (e.g., ⅓ track locations, etc.) can be alternatively used to establish the requisite WRO values.

The routine of FIG. 6 next passes to step 208 wherein a value referred to as a squeeze percentage (SP) is determined for each adjacent seam pair. This value preferably represents the deviation (as a percentage) of the measured WRO to the target (ideal) WRO for the seam pair, such as:

$$SP = \frac{WRO_{MEASURED}}{WRO_{IDEAL}} \% \tag{2}$$

Using equation (2), an SP of 90% would result from a measured WRO that is 9/10 the size of the ideal WRO; an SP of 110% would result from a measured WRO that is 11/10 the size of the ideal WRO, and so on.

Figure 8:
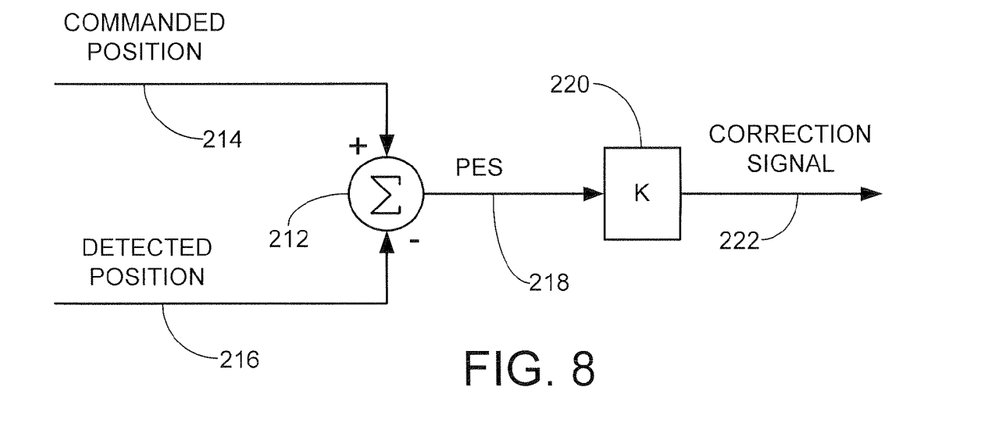
FIG. 8 is a functional representation of a portion of the servo controller of FIG. 2 preferably used to generate a position error signal (PES).

At step 210, a scaled PES is next determined in relation to an actual PES and the SP. FIG. 8 sets forth a generalized functional diagram of portions of the servo controller 120 preferably configured to generate the actual PES.

A summing junction 212 combines the commanded (desired) position for the transducer 112 on path 214 with the detected position on path 216 to output the PES on path 218. The commanded position is supplied for example by servo code, and the detected position is demodulated from the servo dibit patterns transduced by the transducer 112. The PES on path 218 is combined with a gain K of block 220 to provide a correction signal on path 222 used to adjust the output from the motor driver 128 (FIG. 2). Other and more complex forms of signal processing of the PES can readily be applied, however, depending on the requirements of a given application.

In the exemplary quadrature servo system disclosed herein, the actual PES can be represented as:

$$PES_{ACTUAL} = K*(POSITION_{COMMANDED} - POSITION_{DETECTED}) \quad (3)$$

and the detected position can be represented as:

$$POSITION_{DETECTED} = (A-B)-(C-D) \quad (4)$$

The scaled PES of step 210 is thus preferably generated as:

$$PES_{SCALED} = PES_{ACTUAL} * \left(\frac{1}{SP}\right) \quad (5)$$

Adjusting the gain of the servo system in this way will account for non-linearities in the servo system due to the non-ideal WRO prior to the calculation of ERC values to correct for RRO.

At this point it will be noted that step 210 can be readily adapted for use with other demodulation systems, such as a two burst demodulation system that uses a detected position of K*(A−B). In this latter case, if the actual PES is positive for a given seam pair, a correction based on the WRO measured in an outward direction (away from media center 130) is preferably used, while if the PES is negative, an error correction based on the WRO measured in an inward direction (toward center 130) is preferably used.

Continuing with the routine of FIG. 6, at step 224 ERC values are next determined in relation to the scaled PES. A suitable approach that can be adapted for use during this step is generally exemplified by U.S. Pat. No. 6,549,362 to Melrose et al., and preferably comprises convolving the PES with an inverse impulse response of the servo system.

Figure 9:
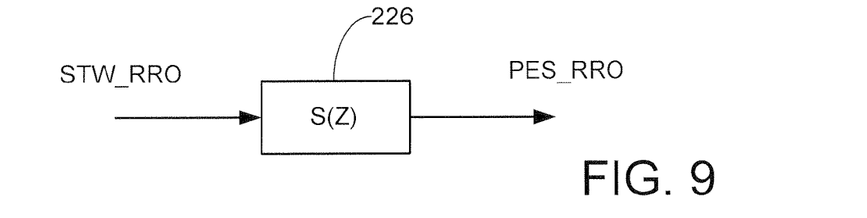
FIG. 9 generally illustrates a functional representation of a system response block to show a system response to servo error.

As shown in FIG. 9, a transfer function block 226 generally relates an input denoted as STW_RRO to an output denoted as PES_RRO. The STW_RRO input generally represents the RRO error of the servo data as originally written during the servo track writing process. The transfer function S(z) generally describes the operation of the servo circuit 120 as it reacts to and follows the perturbed servo data, and the PES_RRO output generally represents the PES values due to RRO that are derived from the operation of the servo circuit in attempting to servo off of the servo data.

Figure 10:
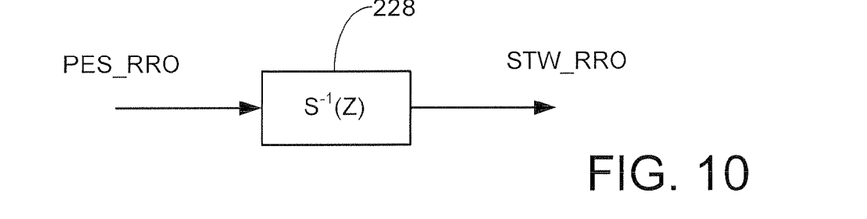
FIG. 10 generally illustrates a corresponding inverse response block.

FIG. 10 provides an inverse transfer function block 228 with system inverse function $S^{-1}(z)$. The inverse function generally enables identification of the STW_RRO values from the measured PES_RRO values. This is preferably carried out with respect to FIG. 11. An input block 230 generally supplies the scaled PES values determined from step 210 in FIG. 6 for each seam pair. An input block 232 generally supplies the inverse function from step 228 of FIG. 10.

The system inverse function can be identified in a number of ways. In a preferred embodiment, an inverse impulse response of the servo circuit 128 is determined through steps including application of a suitable impulse function to the system to generate a response, application of a suitable frequency domain transform to the response such as Discrete Fourier Transform (DFT) to generate an error transfer function, and application of an inverse DFT to provide an inverse error response. Suitable detrending techniques can then be applied as desired to provide the final inverse impulse response.

Figure 11:
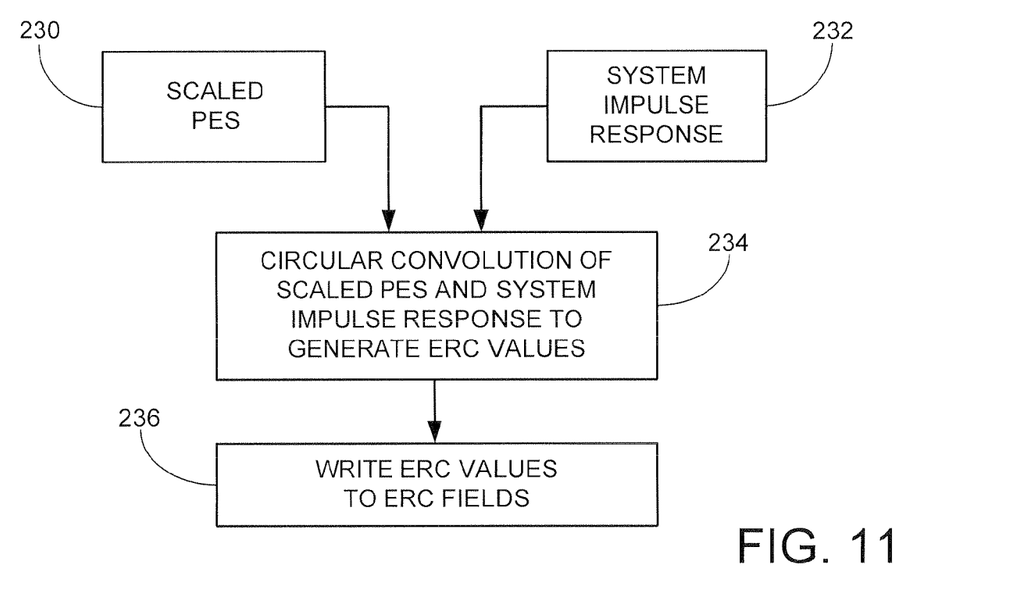
FIG. 11 sets forth a preferred manner in which error runout correction (ERC) values are determined in conjunction with the routine of FIG. 6.

Block 234 of FIG. 11 preferably operates to carry out a circular convolution upon the scaled PES and the inverse impulse response to identify the STW_RRO values, which as noted above, provide a measure of the RRO component of the originally written servo data. Block 236 preferably operates to write corresponding ERC correction values to the media such as in the ERC block 150 of FIGS. 4 and 5. Preferably, a different ERC value is provided for each seam pair.

Figure 12:
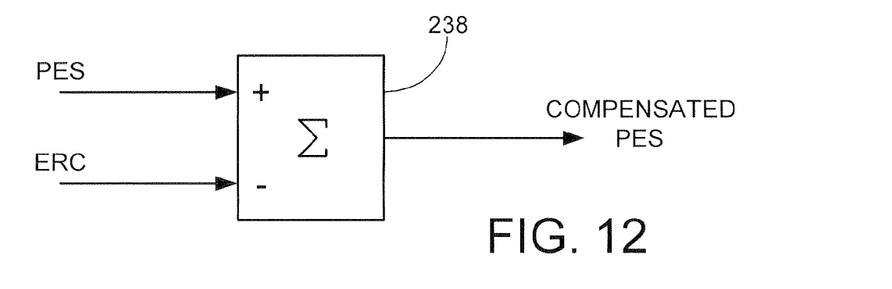
FIG. 12 generally illustrates a preferred manner in which the servo controller of FIG. 2 generates a compensated PES from the ERC values of FIG. 11.

Thereafter, during normal servo operation, the transducer 112 reads the associated ABCD dibit patterns 142, 144, 146, 148 and the associated ERC value as the transducer passes each servo field 136. An initial PES value is determined from the ABCD magnitudes and commanded position such as described above in FIG. 8. As depicted in FIG. 12, the initial PES is then combined with the ERC value, such as by subtracting the ERC from the PES as carried out by summing junction 238, to provide a compensated PES value which enables the servo circuit 120 to follow a nominally concentric path such as 134 in FIG. 3. As desired, the ERC values for the two boundary seams can be combined (e.g., averaged, interpolated, etc.) to provide the ERC value used in FIG. 12.

It is contemplated that it may not be possible, or necessary, to obtain the WRO information as set forth above for every seam pair. However, whenever greater precision in servo operations are required, the various approaches described herein may be advantageously employed. The above approaches can be readily incorporated into other processing steps associated with the device 100, such as during bit error rate (BER) testing, media scanning (MSE), off track read capability (OTRC) measurements, and channel optimization efforts.

In another embodiment, a lookup table is produced for the gain correction as described herein. The lookup table is preferably stored in memory accessible to the servo system. In this case, the gain correction would not necessarily need to be calculated in real time but would still be available for use by the servo control system to more accurately locate the transducers 112 in certain circumstances.

While the foregoing preferred embodiments apply the WRO scaling to the PES values prior to the generation of ERC values, and thereafter apply the ERC values to subsequently generated PES values, it will be appreciated that such is not necessarily required. Rather, it is contemplated that the foregoing can readily be adapted to other types of position signals as well, including but not limited to the actual position signals as described in FIG. 8.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is

1. A method comprising:
    determining a radial separation distance between first and second servo seams on a storage medium;

generating a scaled position signal in relation to the determined radial separation distance and a measured position signal;

obtaining an error runout correction (ERC) value in relation to the scaled position signal by convolving the scaled position signal with an inverse impulse response of a servo system to generate the ERC value; and using the ERC value to compensate for repeated runout (RRO) error.

2. The method of claim 1, wherein the using step comprises transducing servo data associated with the first and second servo seams to provide an initial position signal, combining the initial position signal with the ERC value to provide a compensated position signal, and positioning a transducer in relation to the compensated position signal.

3. The method of claim 1, wherein the measured position signal comprises a position error signal (PES) determined in relation to servo data transduced from the medium by a transducer and a commanded position for the transducer.

4. The method of claim 1, wherein the determining step further comprises determining the radial separation distance based upon a four burst null combination.

5. The method of claim 1, wherein the measured position signal is obtained by a servo controller in relation to readback signals transduced by a transducer adjacent the storage medium.

6. The method of claim 1, wherein the generating step further comprises scaling the measured position signal in relation to a ratio of the determined radial separation distance to an ideal radial separation distance.

7. The method of claim 1, wherein the generating step further comprises scaling the measured position signal in relation to a first ratio of a first radial separation distance to an ideal radial separation distance when the measured position signal is positive, and scaling the measured position signal in relation to a second ratio of a second radial separation distance to the ideal radial separation distance when the measured position signal is negative.

8. The method of claim 1, further comprising storing the ERC value on the storage medium.

9. The method of claim 1, further comprising storing the ERC value in a memory.

10. The method of claim 1, wherein the determining step is carried out over a single revolution of the storage medium as the medium rotates about a central axis.

11. An apparatus comprising:
a storage medium; and
a servo controller configured to determine a radial separation distance between first and second servo seams on the storage medium, to generate a scaled position signal in relation to the determined radial separation distance and a measured position signal, to obtain an error runout correction (ERC) value in relation to the scaled position signal, and to use the ERC value to compensate for repeated runout (RRO) error, wherein the controller convolves the scaled position signal with an inverse impulse response of a servo system to generate the ERC value.

12. The apparatus of claim 11, wherein the servo circuit is further configured to generate an initial position signal from readback signals obtained from servo data associated with the first and second servo seams, to combine the initial position signal with the ERC value to provide a compensated position signal, and to position a transducer in relation to the compensated position signal.

13. The apparatus of claim 11, wherein the measured position signal comprises a position error signal (PES) determined in relation to servo data read from the medium by a transducer and a commanded position for the transducer.

14. The apparatus of claim 11, wherein the servo controller determines the radial separation distance over a single revolution of the storage medium as the storage medium rotates about a central axis.

15. The apparatus of claim 11, wherein the controller further scales the measured position signal in relation to a ratio of the determined radial separation distance to an ideal radial separation distance.

16. The apparatus of claim 11, wherein the servo controller further operates to store the ERC value on the storage medium.

17. The apparatus of claim 11, further comprising a memory in which the ERC value is stored.

18. An apparatus comprising:
a storage medium; and
first means for determining a radial separation distance between first and second servo seams on the storage medium, generating a scaled position signal in relation to the determined radial separation distance and a measured position signal, and obtaining an error runout correction (ERC) value in relation to the scaled position signal to compensate for repeated runout (RRO) error, wherein the first means convolves the scaled position signal with an inverse impulse response of a servo system to generate the ERC value.

19. The apparatus of claim 18 wherein the first means comprises a servo controller.

* * * * *